(12) United States Patent
Lorig et al.

(10) Patent No.: US 12,083,871 B2
(45) Date of Patent: Sep. 10, 2024

(54) DEVICE FOR THE EDGE SEALING OF A PART OR A WINDOW PANE OF A VEHICLE BODY AND METHOD FOR PRODUCING THE SEALING DEVICE

(71) Applicant: CQLT SAARGUMMI TECHNOLOGIES S.À.R.L., Remich (LU)

(72) Inventors: Michael Lorig, Gauting (DE); Sébastien Roux, St-Aubin-Celloville (FR); Daniel Thiel, Beckingen (DE)

(73) Assignee: CQLT SAARGUMMI TECHNOLOGIES S.À.R.L., Remich (LI)

( * ) Notice: Subject to any disclaimer, the term of this patent is extended or adjusted under 35 U.S.C. 154(b) by 1092 days.

(21) Appl. No.: 16/338,222

(22) PCT Filed: Oct. 13, 2017

(86) PCT No.: PCT/EP2017/001210
§ 371 (c)(1),
(2) Date: Mar. 29, 2019

(87) PCT Pub. No.: WO2018/072869
PCT Pub. Date: Apr. 26, 2018

(65) Prior Publication Data
US 2019/0232769 A1     Aug. 1, 2019

(30) Foreign Application Priority Data
Oct. 17, 2016   (DE) ..................... 10 2016 119 691.6

(51) Int. Cl.
*B60J 10/16*    (2016.01)
*B60J 10/265*   (2016.01)
(Continued)

(52) U.S. Cl.
CPC ............. *B60J 10/16* (2016.02); *B60J 10/265* (2016.02); *B60J 10/75* (2016.02); *B60J 10/88* (2016.02); *B60J 10/235* (2016.02)

(58) Field of Classification Search
None
See application file for complete search history.

(56) References Cited

U.S. PATENT DOCUMENTS 5,174,066 A * 12/1992 Dupuy ................... B60J 5/0416
                                                                49/377
5,317,835 A *  6/1994 Dupuy ................... B60J 10/235
                                                                49/377

(Continued)

FOREIGN PATENT DOCUMENTS

| CN | 103842145 A | 6/2014 |
| DE | 10335942 A1 | 3/2005 |

(Continued)

OTHER PUBLICATIONS

International Search Report, Jan. 30, 2018, 2 Pages.

(Continued)

*Primary Examiner* — Catherine A Kelly
(74) *Attorney, Agent, or Firm* — LUCAS & MERCANTI, LLP; Klaus P. Stoffel

(57) ABSTRACT

A device for edge sealing of a part or a window pane of a vehicle body, which device has a fastening dement that fastens the sealing device to a body flange and retaining a sealing strand. The fastening element has a main leg, to which a decorative element is fastened, which has a surface visible after installation on the vehicle body, and a connecting leg, which protrudes from the main leg and is provided for holding the sealing strand. The fastening element and the decorative element and/or the sealing strand are formed of plastic or fiber composite material and the fastening element and the decorative element and/or the sealing strand are (Continued)

molded onto each other by injection molding. The fastening element and the decorative element and/or the sealing strand are produced by multi-component injection molding. The invention further relates to a method for producing such a sealing device.

21 Claims, 2 Drawing Sheets

(51) Int. Cl.
    *B60J 10/75*           (2016.01)
    *B60J 10/88*           (2016.01)
    *B60J 10/235*       (2016.01)

(56) References Cited

U.S. PATENT DOCUMENTS

| | | | |
|---|---|---|---|
| 5,582,895 A | 12/1996 | Dupuy | |
| 6,321,490 B1* | 11/2001 | Vance | B29C 65/56 |
| | | | 49/377 |
| 6,679,003 B2* | 1/2004 | Nozaki | B60J 5/0402 |
| | | | 49/441 |
| 8,166,708 B2* | 5/2012 | Ellis | B60J 10/26 |
| | | | 49/490.1 |
| 8,434,267 B2* | 5/2013 | Bocutto | B60J 10/70 |
| | | | 49/479.1 |
| 8,714,624 B2* | 5/2014 | Fukui | B60J 10/30 |
| | | | 296/146.1 |
| 8,714,625 B2 | 5/2014 | Kreye | |
| 8,782,954 B2* | 7/2014 | Kawai | B60J 10/87 |
| | | | 49/475.1 |
| 9,027,284 B2* | 5/2015 | Murree | B60J 10/265 |
| | | | 49/495.1 |
| 9,840,207 B2 | 12/2017 | Blottiau | |
| 9,963,088 B2* | 5/2018 | Yoshida | B60J 10/265 |
| 10,112,468 B2* | 10/2018 | Miyata | B60J 10/16 |
| 10,604,335 B2* | 3/2020 | Sasaki | B60J 10/75 |
| 10,752,184 B2* | 8/2020 | Husek | B29C 48/16 |
| 2002/0108313 A1* | 8/2002 | Nozaki | B60J 10/16 |
| | | | 49/441 |
| 2005/0120634 A1* | 6/2005 | Drivon | B60J 10/30 |
| | | | 49/475.1 |
| 2012/0167473 A1 | 7/2012 | Schapitz | |
| 2014/0007511 A1 | 1/2014 | Franzen | |
| 2014/0212621 A1* | 7/2014 | Blottiau | B29C 45/0003 |
| | | | 428/99 |

FOREIGN PATENT DOCUMENTS

| | | |
|---|---|---|
| DE | 102008026922 A1 | 12/2009 |
| EP | 2463134 A1 | 6/2012 |
| EP | 2803518 A2 | 11/2014 |
| EP | 2310231 B1 | 7/2015 |
| GB | 2287429 A | 9/1995 |
| JP | 2002512915 A * | 5/2002 |
| WO | WO-2011095748 A1 * | 8/2011     B60J 10/32 |

OTHER PUBLICATIONS

German Search Report, Jul. 5, 2017, 9 Pages.
Chinese Office Action Dated Oct. 29, 2021 And English Translation Thereof, 19 Pages.

* cited by examiner

DEVICE FOR THE EDGE SEALING OF A PART OR A WINDOW PANE OF A VEHICLE BODY AND METHOD FOR PRODUCING THE SEALING DEVICE

The present application is a 371 of International application PCT/EP2017/001210, filed Oct. 13, 2017, which claims priority of DE 10 2016 119 691.6, filed Oct. 17, 2016, the priority of these applications is hereby claimed and these applications are incorporated herein by reference.

BACKGROUND OF THE INVENTION

The invention relates to a device for the edge sealing of a part or a window pane of a vehicle body which has a securing element by means of which the sealing device can be fixed to a body flange and which is provided to retain at least one sealing strip, wherein the securing element comprises a main member to which there is secured a trim element which has a viewing surface which is visible after installation on the vehicle body, and comprises at least one connection member which protrudes from the main member and which is provided to receive the sealing strip.

The invention further relates to a method for producing such a sealing device.

Such sealing devices which are known through use are used to form window guiding seals and window shaft seals of motor vehicles. The trim element, the sealing strip and the securing element are produced individually and connected to each other before they are installed on the respective motor vehicle, wherein the trim element is adhesively bonded to the outer side of the main member or is secured at that location and the sealing strip is attached or adhesively bonded to the connection member.

SUMMARY OF THE INVENTION

An object of the invention is to provide a sealing device of the type mentioned in the introduction which can be produced ready for installation with less complexity.

This object is achieved according to the invention in that the securing element and the trim element and/or the sealing strip are formed from plastics material or composite fiber material and the securing element, on the one hand, and the trim element and/or the sealing strip, on the other hand, are formed on each other by means of injection-molding.

The sealing device according to the invention can be produced by the securing element, the trim element or the sealing strip first, being produced, where applicable using the injection-molding method, and another component of the sealing device, that is to say, in each case the trim element. The sealing strip or the securing element, being injection-molded thereon with the injection-molding method.

Advantageously, a connection of the trim element, the sealing strip or the securing element to the component which has already been produced is already formed during the production thereof by means of injection-molding. Since the separate method step which is required for the sealing devices according to the prior art for connecting the components is omitted, a particularly simple and rapid production becomes possible.

Whilst it would be conceivable to first produce the trim element or the sealing strip and to injection-mold the securing element, where applicable at the same time, on the trim element or the sealing strip, in the preferred embodiment of the invention the securing element Is first produced and the trim element or the sealing strip is injection-molded onto the securing element.

Of course, the sealing device may further be provided in such a manner that the trim element and the sealing strip are also formed directly one on the other.

In an embodiment of the invention, the securing element and the trim element and/or the sealing strip are produced by means of multi-component injection-molding, wherein the sealing device is produced by means of an injection-molding machine which comprises two or more injection units, but only one closure unit. Advantageously, the sealing device can be produced using only a single tool in a single operating step. The different individual operating steps required for assembling the known sealing devices are dispensed with.

In an embodiment of the invention, the trim element is formed from a plastics material which is suitable, for metallization, in particular chrome-plating, of the plastics material, for being provided with an electrically conductive layer on which as a result of electroplating a metal layer can be deposited. Preferably, acrylonitrile butadiene styrene (ABS) is used to form the securing element since this plastics material has been found to be particularly suitable for metallization using the mentioned method. Advantageously, the trim element, after the seating device has been produced by means of injection-molding, using a plastics material metallization method known from the prior art, can be provided with a surface having a metallic appearance.

For metallization, the plastics material may, for example, initially be pickled with an oxidative metal salt solution in order to roughen the surface; subsequently the surface can be activated with metal nuclei, for example, palladium, and can subsequently be metallized chemically with a thin layer of copper or nickel being produced by means of reduction from metal salts. There is then deposited the metal layer which is intended to be provided on the plastics material and which is intended to provide the trim element with the metallic appearance in an electroplating bath on the thin layer. If the plastics material is intended to be plated with chromium, layers of copper and nickel can first be deposited in order to achieve good adhesion.

The sealing strip and where applicable also the securing element may be formed from plastics material, which is not suitable or provided for metallization so that the sealing device, after it has been produced by means of injection-molding, can be processed as a whole in a plastics material electroplating process without the electroplating also being carried out on the sealing strip or the securing element.

Furthermore, the trim element could, depending on the desired appearance, be formed from a thermoplastic plastics material. In order to give the trim element a matt appearance, it is preferably formed from styrene block copolymer-based TPE (TPS) or from thermoplastic vulcanizate (TPV). Furthermore, it could be formed from polymethyl methacrylate (PMMA), polycarbonate/ acrylonitrile butadiene styrene (PC/ABS), styrene acrylonitrile (SAN) and/or acrylester styrene acrylonitrile (ASA). The trim element may consequently be given an appearance which is shiny, in particular in a paint-like manner.

In another embodiment of the invention, the securing element is formed from fiber composite material and the fiber composite material preferably has as a matrix at least one of the plastics materials polypropylene (PP), polycarbonate (PC) or acrylonitriie butadiene styrene (ABS) and/or a fiber reinforcement, preferably of glass fibers and/or carbon fibers.

The sealing strip is advantageously formed from a thermoplastic polymer, preferably from styrene block copolymer-based thermoplastic elastomer material (TPS) or from thermoplastic vulcanizate (TPV).

In another embodiment of the invention, the securing element has a clamping and/or locking member which protrudes from the main member, preferably substantially perpendicularly, and which is arranged in such a manner that there is formed between the clamping and/or locking member and the connection member, which preferably also protrudes substantially perpendicularly from the main member, an insertion slot for receiving the body flange so that the sealing device can be fitted on the the body flange in order to be secured.

The clamping and/or locking member and the connection member are preferably constructed in such a manner that the sealing device, when arranged by means of the clamping and/or locking action of the clamping and/or locking member and the connection member on the body flange, can be secured.

In another embodiment of the invention, the connection member and/or clamping and/or locking member is/are provided with recesses which are arranged in the longitudinal strip direction of the sealing device with spacing from each other.

The recesses may serve to receive securing hooks which are arranged on the body flange. Preferably, the recesses are then formed in such a manner that the securing hooks, when the sealing ring is arranged on the body flange, engage in a fitting manner therein.

Furthermore, the recesses may be provided to receive pin portions which are formed on the sealing strip and which comprise the same material as the sealing strip and which are preferably formed integrally with the sealing strip. Preferably, the pin portions protrude through the recesses and are provided for abutment against the body flange in order to support the securing element when it is secured to the body flange.

In an embodiment of the invention, during the injection-molding operation, plastics material, by means of which the sealing strip is formed in order to form pins which protrude from the sealing strip, is injection-molded through the recess. An injection-molding tool of the injection-molding machine mentioned is preferably provided in such a manner that the plastics material which forms the pin is not only arranged inside the recess, but also arranged at the side of the connection member or the clamping and/or locking member facing the body flange, preferably in such a manner that in the installed state it rests between the body flange and the connection member or the clamping and/or locking member.

Advantageously, the sealing device comprises an additional sealing strip which is preferably provided for the edge-side sealing of the window pane or the part, wherein the additional sealing strip is preferably formed from synthetic rubber, preferably from ethylene propylene diene rubber (EPDM) or thermoplastic elastomer material (TP).

In another embodiment of the invention, the additional sealing strip can be connected, preferably by means of locking and/or clamping, to the securing element, preferably in such a manner that the securing element and the sealing strip are directly retained on each other. The additional sealing strip and the securing element are to this end advantageously adapted to each other in terms of their shapes so that the additional sealing strip can be secured to the securing element, for example, by means of clamping, insertion or locking. In contrast to combinations known from the prior art comprising the securing element and sealing strip, in this embodiment the securing element and the additional seating strip may already be connected to each other prior to their installation on the body. Advantageously, the manufacturer may supply the sealing device according to the invention in a state already assembled. The arrangement of the sealing device on the body is then simplified considerably and can be carried out in a significantly shorter time.

Advantageously, the securing element and/or the additional sealing strip is/are provided with one or more hooks by means of which they can be secured to a counter-holder which is provided on an additional sealing strip or the securing element, where applicable with engagement.

The invention is explained in greater detail below with reference to embodiments and the appended drawings which relate to these embodiments.

DETAILED DESCRIPTION OF THE INVENTION

Figure 1:
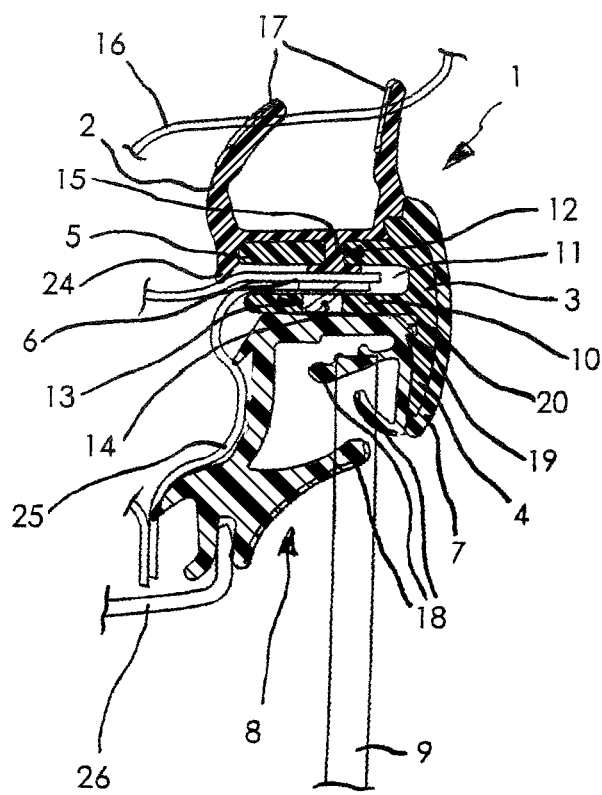
FIG. 1 is a cross-sectional illustration of a sealing device according to the invention.

FIG. 1 is a cross-section of a strip-like sealing device 1 according to the invention which is arranged on a body flange 6 of a vehicle door and which is provided for sealing a movable window pane 9 and for sealing the vehicle door against a body portion 16 which forms the door frame.

The sealing device 1 comprises a securing element 3 which has a main member 4 and a connection member 5 which protrudes substantially perpendicularly therefrom and has with spacing therefrom a clamping and/or locking member 10 which protrudes substantially perpendicularly from the main member 4. At a side of the main member 4 facing away from the connection member 5 and the damping and/or locking member 10, there is arranged on the main member 4 a trim strip 7 which completely covers the main member 4 at the side mentioned and which forms a viewing face which is visible from the outer side.

On the connection element 5 there is arranged a sealing strip 2 which serves to seal the vehicle door against the body portion 16. The sealing strip 2 comprises two members which are provided for abutment against the body portion 16 and which are provided with a surface structuring on abutment faces 17 which are provided in each case for this purpose. In the connection member 5 there are formed in the longitudinal direction with spacing from each other a plurality of recesses 12 through which there extend pins 15 which protrude from the sealing strip 2 and which are formed in such a manner that they are arranged in an upper region between the body flange 6 and the side of the connection member 5 facing the body flange 6 and in the installed state are in abutment against both the connection member 5 and the body flange 6.

Furthermore, the sealing strip 2 comprises a sealing projection 24 which is arranged at the end of the connection member 5 which faces away from the main member 4 and which seals the space between the connection member 5 and the body flange 6 in an outward direction.

The connection member 5, the pin 15 and the clamping and/or locking member 10 are arranged with such spacings from each other and have such a shape that between them an insertion slot 11 for receiving the body flange 6 is formed and, with a clamping action being formed, they can be placed in a stable manner on the body flange 6. In the clamping and/or locking member 10, there are formed in the longitudinal direction with spacing from each other recesses 13 which are provided for receiving in a fitting manner hook elements 14 which protrude from the body flange 6 and which are provided for securing the sealing device 1 on the body flange 6.

At the side of the main member 4 facing away from the trim strip and the side of the clamping and/or locking member 10 facing away from the connection member 5, there is arranged on the securing element 3 an additional sealing strip 8 which is provided to seal the window pane 9 and which for this purpose has a plurality of sealing members 18 which are provided for abutment against the window pane 9. At an inner side of the main member 4, there is formed a locking projection 19 which acts as a counter-holder to a locking projection 20 which is formed on the additional sealing strip. The additional sealing strip 8 is further provided for support on additional portions 25, 26 of the body.

The securing element 3, the trim element 7 and the sealing strip 2 have been produced using the multi-component injection-molding method one after the other in an injection-molding machine which comprises two or more injection units, but only one closure unit so that the sealing device 1 can be produced using only a single tool in a single operating step.

In a first operating step, the securing element 3 is produced and subsequently the trim strip 7 is first injection-molded on the securing element 3 and afterward the sealing strip 2 is injection-molded onto the securing element 3 and the trim strip 7. For the last-mentioned operating step, the injection-molding tool is provided in such a manner that the material which is provided to form the sealing strip 2 can flow through the recesses 12 in the connection member 5 in order to form the pins 15.

The securing element 3 is formed from a fiber composite material, preferably with a matrix of polypropylene (PP), polycarbonate (PC) or acrylonitrile butadiene styrene (ABS) and with glass fibers or carbon fibers as reinforcement material.

The trim strip 7 is formed from a thermoplastic plastics material, depending on the desired appearance of the visible face, for example, from styrene block copolymer-based TPE (TPS) or from thermoplastic vulcanizate (TPV), from polymethyl methacrylate (PMMA), from a mixture of polycarbonate and acrylonitrile butadiene styrene (PC/ABS), from styrene acrylonitrile (SAN) or from acrylester styrene acrylonitrile (ASA).

Furthermore, the trim strip 7 may be formed from an electroplatable plastics material, for example, acrylonitrile butadiene styrene (ABS) if it is intended to be given a metallic appearance.

The sealing strip 2 is also formed from a thermoplastic polymer, for example, from TPS or TPV.

If the trim strip 7 is intended to be provided with a metallic-looking visible face, the trim element 7 is formed from a plastics material, for example, ABS, which is suitable for coating with an electrically conductive layer which adheres securely to the plastics material and on which, by means of electroplating in an electroplating bath, a metal layer can be deposited. After production of the sealing element 1, the trim element is electroplated in a manner known per se by means of a plastics material electroplating method. If there is used to produce the securing element 3 and the sealing element 2 a plastics material or fiber composite material, on which during electroplating of the entire securing element 3 in an electroplating bath no metal is deposited, for example, since there is no electrically conductive layer provided thereon, the surface with a metallic appearance is formed exclusively on the trim element 7.

The additional sealing strip 8 is in the present example formed from ethylene propylene diene rubber (EPDM) or thermoplastic elastomer material (TPE) and is produced in a separate operating step and fitted to the securing element 3. However, it would also be conceivable to form the additional sealing strip 8 similarly from a thermoplastic material, for example, TPS or TPV, and with a multi-component injection-molding method to form it directly on the securing element 3.

The sealing device 1 is installed on the body by being placed on the body flange 6 in such a manner that it protrudes into the insertion slot 11 between the connection member and the clamping and/or locking member 10, wherein the hooks 14 of the body flange 6 engage in the recesses 13 in the clamping and/or locking member 10. The sealing device 1 is then, on the one hand, retained by means of a clamping action between the clamping and/or locking member 10 and the pins 15 and, on the other hand, by the hooks 14 on the body flange 6. Since the pins 15, in the same manner as the sealing strip 2, are formed from a material which is softer than the securing element 3, as a result of the pins 15 a particularly stable arrangement is enabled for the body flange 6. The additional sealing strip 8 is retained, on the one hand, by means of the locking projection 19 of the main member 4 and, on the other hand, by means of the support thereof on the body portions 25, 26. The securing element 3 and the additional sealing strip 8 are thus only assembled during the installation of the sealing device 1 on the body flange 6 and, as a result of the support on the body portions 25, 26 and on the body flange 6, on the other hand, are retained one on the other.

Figure 2:
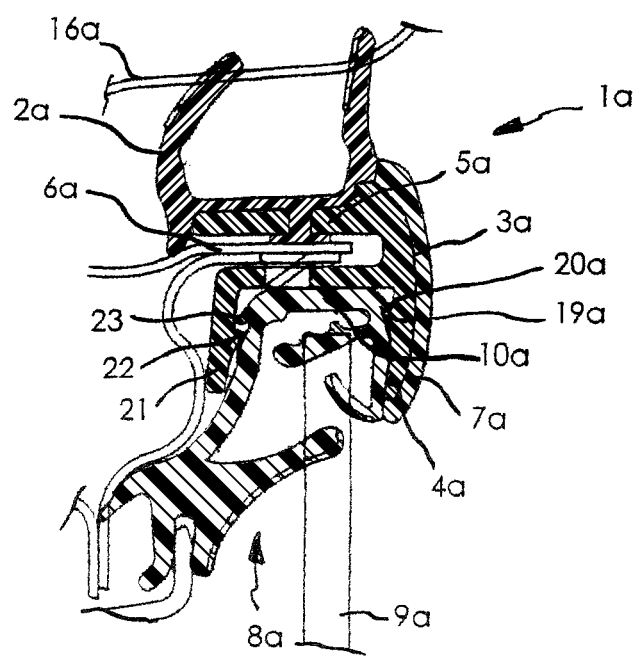
FIG. 2 shows another sealing device according to the invention in cross-section.
Figure 3:
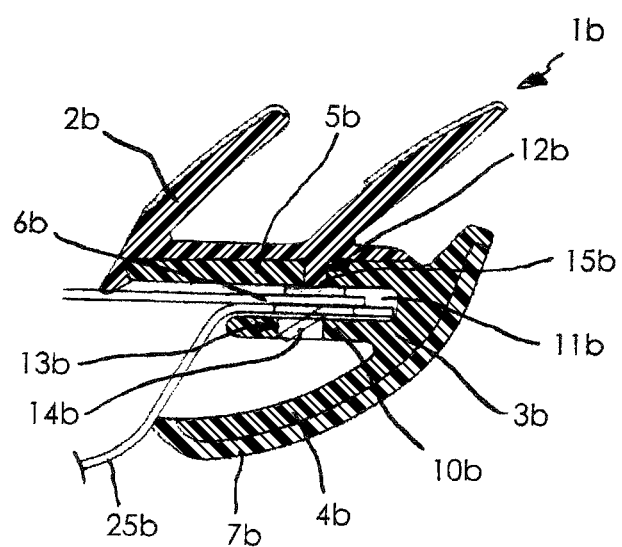
FIG. 3 shows another sealing device according to the invention in cross-section.

Reference is now made to FIGS. 2 and 3, wherein components which are identical or which have the same effect are given the same reference numeral as in FIG. 1 and a letter is appended to the relevant reference numeral in each case.

An additional sealing device 1a according to the invention shown in FIG. 2 differs from the one according to FIG. 1 as a result of the shape of the clamping and/or locking member 10a of the securing element 3a thereof. At one end of a clamping and/or locking member 10a which faces away from a main member 4a, there is formed an angled portion in the direction away from a connection member 5a, which at the side thereof facing the main member 4a, is provided with a locking projection 22 which is provided as a counter-holder for a locking projection 23 which is formed on an additional sealing strip 8a.

The additional sealing strip 8a can be inserted into the space between the clamping and/or locking member 10a and the main member 4a and retains at that location by means of locking actions of the locking projections 22, 23 mentioned and a locking projection 19a formed on the inner side of the main member 4a and an additional locking projection 20a formed on the additional sealing strip 8a.

The additional sealing strip 8a may already prior to installation on the body be secured to the securing element 3a in such a manner that it independently retains at that location. The installation complexity of the sealing device 1a which has already been assembled in this manner is thereby simplified significantly, for example, in comparison with the sealing device according to FIG. 1.

FIG. 3 shows another sealing device 1b according to the invention which is suitable for sealing a window shaft. The sealing device 1b differs from the one according to FIGS. 1 and 2 in particular as a result of the shape of a sealing strip 2b which is provided in such a manner that the sealing strip 2b is suitable for sealing a window pane which is intended to be arranged in the window pane. Furthermore, a securing element 3b and a trim strip 7b for sealing the window shaft have adapted shapes, wherein a main member 4b of the securing element 3b and the trim strip 7b are shaped in such a manner that an end of the trim strip 7b facing away from the sealing strip 2b is in abutment with a lower portion 25b of a body flange 6b.

Both in the sealing device 1a according to FIG. 2 and in the sealing device 1b according to FIG. 3, the securing element 3a, 3b, the trim strip 7a, 7b and the sealing strip 2a, 2b are produced as above for the sealing device 1 according to FIG. 1 by means of multi-component injection-molding in a single operating step. It is also possible to use to this end, the materials mentioned above for the sealing strip 1. A visible face of the trim strip 7a, 7b can, as explained above, be provided with a metallic appearance by means of a plastics material electroplating method.

The invention claimed is:

1. A device for edge sealing a part of a window pane of a vehicle body, the device comprising: a securing element by which the sealing device is fixable to a body flange; at least one sealing strip retained by the securing element; and a trim element that has a viewing surface visible after installation on the vehicle body, wherein the securing element comprises a main member to which the trim element is secured, and a connection member that protrudes from the main member and is provided to receive the at least one sealing strip, wherein the securing element is formed from plastic material or composite fiber material, and the trim element and/or the sealing strip are formed from plastic material, and the securing element and the trim element and the sealing strip are made of different plastic materials and together form a multi-component injection-molded part, wherein the securing element has a clamping and locking member that protrudes from the main member and is arranged so as to form an insertion slot between the clamping and locking member and the connection member, the body flange being insertable in the insertion slot to secure the sealing device, wherein the connection member and/or the clamping and locking member have recesses, and wherein the sealing strip has pins that protrude through the recesses in the connection member and are provided for abutment against the body flange to support the securing element when secured to the body flange.

2. The device according to claim 1, wherein the trim element is made of a plastic material that is capable of metallization.

3. The device according to claim 2, wherein the trim element is made of acrylonitrile butadiene styrene.

4. The device according to claim 2, wherein the trim element has an electrically conductive layer.

5. The device according to claim 1, wherein the trim element is made of a thermoplastic plastic material.

6. The device according to claim 5, wherein the trim element is made of at least one of the group consisting of styrene block copolymer-based thermoplastic elastomer material, thermoplastic vulcanizate, polymethyl methacrylate, polycarbonate/acrylonitrile butadiene styrene, styrene acrylonitrile and acrylester styrene acrylonitrile.

7. The device according to claim 1, wherein the securing element is made of fiber composite material.

8. The device according to claim 7, wherein the fiber composite material has as a matrix at least one of polypropylene, polycarbonate or acrylonitrile butadiene styrene, and/or a fiber reinforcement.

9. The device according to claim 8, wherein the fiber reinforcement includes glass fibers and/or carbon fibers.

10. The device according to claim 1, wherein the sealing strip is made of a thermoplastic polymer.

11. The device according to claim 10, wherein the sealing strip is made of styrene block copolymer-based thermoplastic elastomer material or thermoplastic vulcanizate.

12. The device according to claim 1, wherein the clamping and/or locking member and the connection member are provided so that the sealing device when arranged by clamping and/or locking action of the clamping and/or locking member and the connection member is securable to the body flange.

13. The device according to claim 1, further comprising an additional sealing strip connectable to the securing element.

14. The device according to claim 13, wherein the additional sealing strip and the securing element are adapted to each other in terms of shape so as to be independently retained on one another when connected together.

15. A method for producing a device for edge sealing a part or a window pane of a vehicle body, which has a securing element by which the sealing device is securable to a body flange and which is provided to retain a sealing strip, wherein the securing element comprises a main member on which there is secured a trim element, which has a viewing face visible after installation on the vehicle body, and at least one connection member that protrudes from the main member and is provided for receiving the sealing strip, wherein the securing element has a clamping and locking member that protrudes from the main member and is arranged so as to form an insertion slot between the clamping and locking member and the connection member, the body flange being insertable in the insertion slot to secure the sealing device, wherein the connection member and/or the clamping and locking member have recesses, and wherein the sealing strip has pins that protrude through the recesses in the connection member and are provided for abutment against the body flange to support the securing element when secured to the body flange, the method comprising the steps of:

making the securing element and the trim element and/or the sealing strip from plastic material and/or fiber composite material; and forming the securing element, on the one hand, and the trim element and/or the sealing strip, on the other hand, on each other by multi-component injection-molding, wherein the securing element, the trim element and the sealing strip are made of different plastic materials.

16. The method according to claim 15, including injection molding the trim element and/or the sealing strip on the securing element or injection molding the securing element on the trim element and/or the sealing strip.

17. The method according to claim 15, including producing the securing element and the trim element and/or the sealing strip by multi-component injection-molding.

18. The method according to claim 15, wherein the trim element is made of a plastic material suitable for metallization of the plastic material.

19. The method according to claim 18, wherein the trim element is made of acrylonitrile butadiene styrene.

20. The method according to claim 18, including providing the trim element with an electrically conductive layer.

21. The method according to claim 15, including forming a recess in the main member and/or in the clamping and locking member of the securing element and during the injection-molding, the plastic material by which the sealing strip is formed is injection-molded through the recess to form the pins that protrude from the sealing strip.

* * * * *